Sept. 20, 1955   L. J. HAMMAN   2,718,277
AIR CLEANER CONSTRUCTION
Filed April 17, 1952
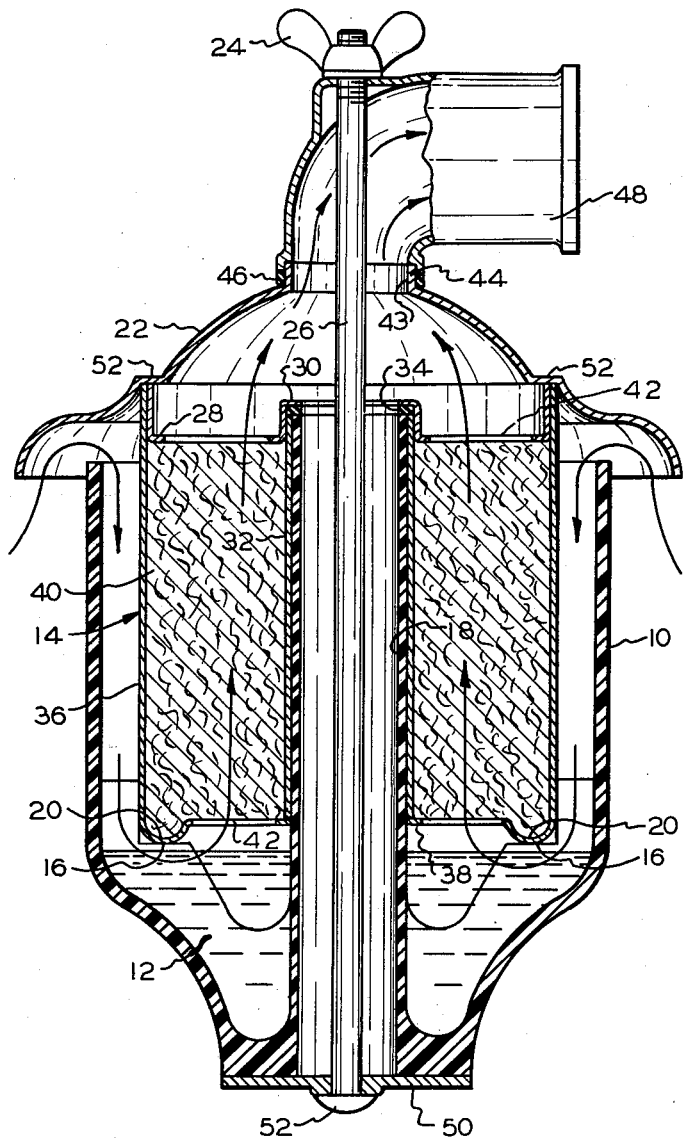
FIG. I.
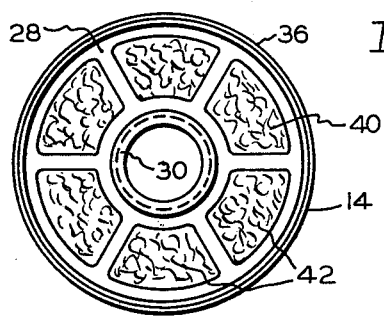
FIG. II.
INVENTOR
LYLE J. HAMMAN
BY
ATTORNEY

United States Patent Office 2,718,277
Patented Sept. 20, 1955

2,718,277
AIR CLEANER CONSTRUCTION

Lyle J. Hamman, Eaton Rapids, Mich., assignor to Eaton Stamping Company, Eaton Rapids, Mich., a corporation of Michigan Application April 17, 1952, Serial No. 282,767

1 Claim. (Cl. 183—44)

This invention relates to air cleaners of the kind employed to clean the air supply to internal combustion engines, compressors and the like and to improvements in the air cleaner construction according to my prior Patent Number 2,514,543, assigned to Eaton Stamping Company and patented July 11, 1950.

In the prior patent there is disclosed an air cleaner construction incorporating a transparent body of plastic material having a central tube forming an air down-flow tube and having a series of radial webs defining ledges against which the bottom of a filter body is initially held located and is finally firmly held thereagainst by pressure applied to the upper end of the filter body through the tightening of a removable lid closure against the upper end of the filter body.

It has been found, through extensive use of these prior filter constructions, that with the filter body initially located against the aforesaid ledges the latter have to take the full force of the lid tightening pressure, with the result that damage or undesirable distortion is liable to occur with respect to the plastic ribs and their integral body part. It is a further object of the invention to provide an air filter of the above kind in which the filter body is formed to have piloted engagement with respect to the air-flow tube and is supported in part on the tube and in part on the said locating ledges.

It is an object of the present invention to overcome the above stated disadvantages in the prior filter construction by providing an improved filter construction in which the aforesaid locating ledges are relieved of the full force of the lid pressure.

These and further objects and advantages of the invention, residing in the construction, arrangement and combination of parts, will appear clear from a consideration of the following description of one practical form of the invention, by way of example, with reference to the accompanying drawings and from the appended claim.

In the drawings:

Fig. I is a vertical section of one form of filter in accordance with the invention, with the parts thereof assembled to provide for an up-flow of the air therethrough, and Fig. II is a plan view of the filter body as seen in Fig. I.

Referring to the drawings, 10 indicates a cup-like plastic liquid supporting body of the same general construction and purpose as disclosed in the said prior Patent Number 2,514,543, with the internal radial webs indicated at 12 and the ledges for supporting and locating the bottom of the filter body 14 indicated at 16.

In the present construction, however, the filter body 14 is formed to be initially supported upon the upper end of the central air flow tube 18, with the bottom end 20 of the filter body being initially held slightly out of contact with the ledges 16 until the closure lid 22 is tightened upon the filter body by the tightening of the nut 24 on the central rod 26. To this end the filter body 14 is formed with an annular end cup 28 having a raised flange 30 around its inner peripheral portion positioned to overlie the upper end of a central tube 32, forming part of the filter body casing, and the upper end of the air flow tube 18, there being a gasket ring 34 interposed between the flange 30 and the upper end of the air flow tube 18 and the depth of the filter body, between the flange 30 and the bottom 20, in relation to the upper end of the air flow tube and the ledges 16 being chosen so that there is clearance between the bottom 20 and the ledges 16, when the filter body is first assembled over the tube 18, to the extent that this clearance can be taken up by distortion of the gasket ring 34 when the nut 24 is actuated to tighten the closure lid 22 upon the top of the filter body 14.

The separate central tube 32 of the filter body may be formed into shape from sheet metal and is shown retained between the separately formed top end cap 28 and the inner periphery of an annular bottom wall 38 integral with an outer cylinder 36 constituting the outer wall of the filter body. The wall 38 is formed with a depending annular peripheral rib which defines said bottom end 20 of the filter body, the filtering material of which is indicated at 40. Both the upper end cap 14 and the bottom wall 38 are formed with cut out openings, of which the openings in the end cap 14 are indicated at 42 in Fig. II, there being similar openings provided in the bottom wall 38. These openings expose the filtering material to the flow therethrough of the air to be filtered.

The end cap 22 is formed with an annular ledge 52 adapted to seat against the upper end of the filter body 14 and is also formed with a central opening 43 defined by an upstanding flange 44 about which a gasket ring 46 is conveniently mounted to form a seal with respect to the lower end of a duct member 48 capable of being secured upon the top of closure lid 22 through the medium of the rod 26 and nut 24, the rod also receiving a washer member 50 for sealing against the bottom of the body 10 by a head 52 on the rod tightening against the washer element when the nut 24 is tightened.

With the parts assembled together, as seen in Fig. I, the filter is adapted for an up-flow of the filter cleansed air through the outlet duct 48, with the air flow through the filter being constrained to take place in the direction indicated by the arrows. It is possible, however, to adapt the filter for a down-flow of the air, as disclosed in the prior Patent Number 2,514,543, by appropriate re-positioning of the outlet duct 48, which can be fitted against the opening in the bottom of the body 10, with the washer closing the lid closure opening 43, or which lid closure 22 can be replaced by a closure having a smaller central opening for the tightening of the nut 24 thereagainst as disclosed in said prior patent.

It will be appreciated, from consideration of this filter construction, that when the lid closure 22 is tightened upon the body part 10 the outer wall 36 of the filter body 14 is supported against the ledges 16 of the strengthening and partition webs 12 and that the filter body is also supported at the center upon the central tube 18 through the medium of the flange 30 and sealing washer 34. The filter body 14 is thus in part supported by the outer body part 10 and in part upon the central tube 18, with the strain thereon, due to tightening of the nut 24, being evenly distributed and with the top end of the tube 18 being protected by the presence of the flange 30 and washer 34, it being realized that the washer will yield sufficiently under the tightening pressure of the nut 24 to permit the bottom 20 of the filter body 14 to be moved from its initial position, as seen in Fig. I, into contact with the ledges 16 and that the central tube 32 of the filter body guides and centralizes the filter body as a unit with respect to the tube 18.

Having thus described my invention, what I claim as novel and wish to secure by Letters Patent is as follows:

An air cleaner comprising a unitary molded plastic hollow body part having a cylindrical outer wall and a cylindrical inner wall integral with said outer wall, said inner and outer walls being joined at their lower ends, said walls being concentric and spaced from each other to form an annular air passage between them above said lower ends, ledge structure integral with and extending between said walls at their lower ends, a separate filter unit having outer and inner concentric cylindrical walls, said inner wall of said unit being telescoped upon said inner body part wall and said outer wall of said unit being spaced from said outer body part wall and resting upon said ledge structure at its lower end, said inner wall of said unit having a radial annular shoulder, a yieldable gasket disposed between said shoulder and the top of said inner wall of said body part, a cover for said body part and said unit resting upon said unit at its upper edge and supported thereby, means for securing said cover relative to said body including a draw bolt having its head anchored to said body and extending axially through said inner body wall and through said cover, and means attached to said bolt and acting upon said cover to hold said outer wall of said unit to said ledge structure upon compression of said gasket between said shoulder and said inner body wall.

References Cited in the file of this patent

UNITED STATES PATENTS

| | | |
|---|---|---|
| 2,287,806 | Kamrath | June 30, 1942 |
| 2,290,092 | Brown | July 14, 1942 |
| 2,514,543 | Hamman | July 11, 1950 |
| 2,627,934 | Mortinek | Feb. 10, 1953 |